(No Model.)
W. S. SMITH.
SAW SETTING MACHINE.
No. 384,094. Patented June 5, 1888.
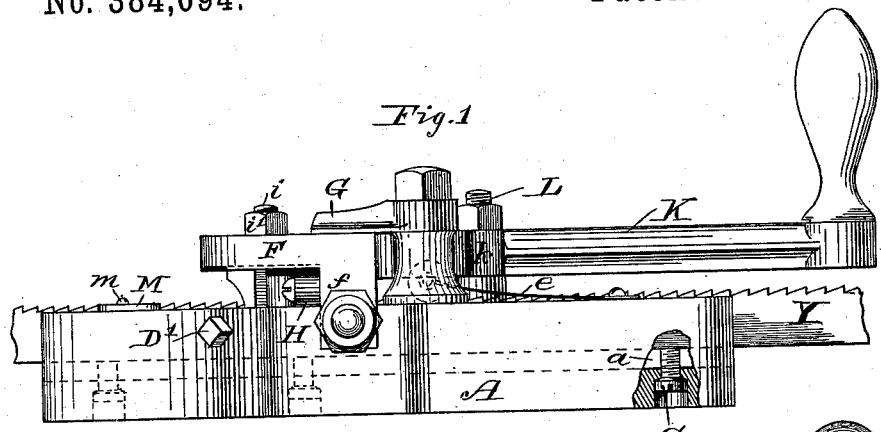
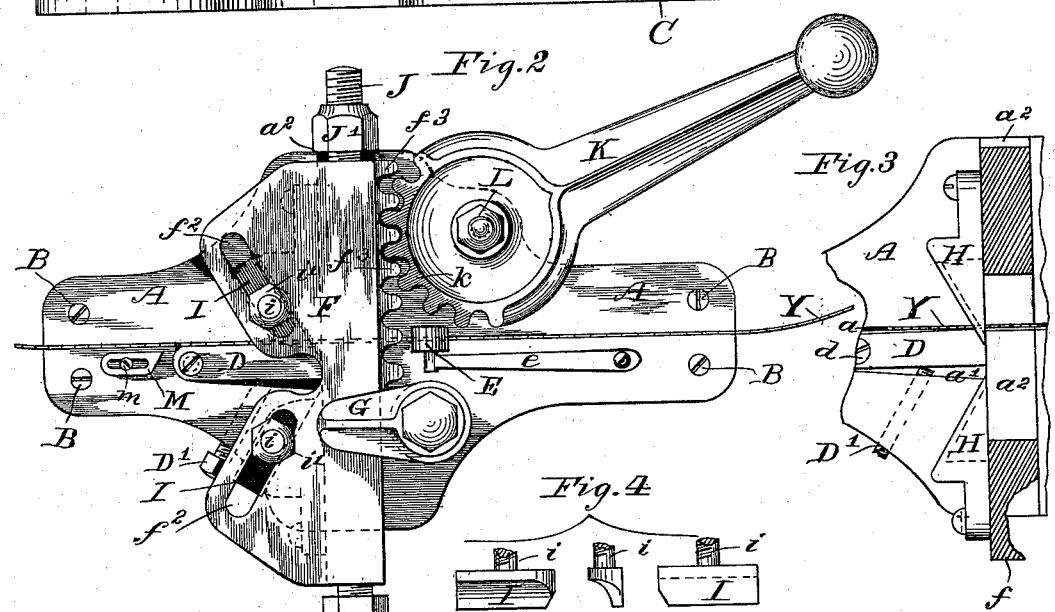
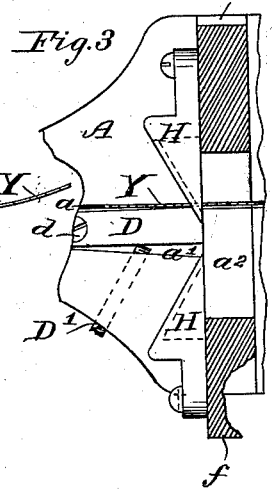
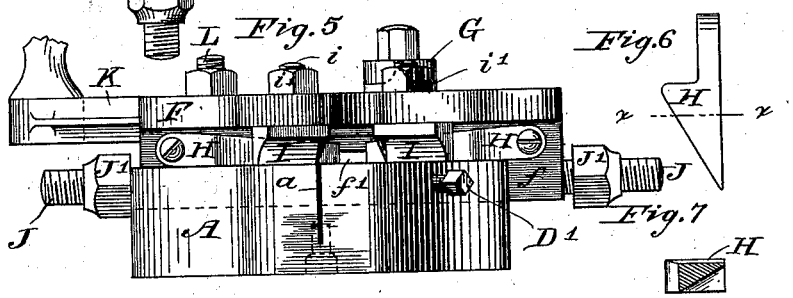
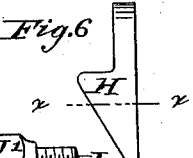
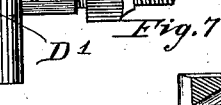
Witnesses.
W. L. Jenks.
C. E. Stanells.
Inventor.
W. S. Smith.
By J. S. Thurston.
Attorney.

UNITED STATES PATENT OFFICE.

WARREN S. SMITH, OF ST. JOHNSBURY, VERMONT.

SAW-SETTING MACHINE.

SPECIFICATION forming part of Letters Patent No. 384,094, dated June 5, 1888.

Application filed August 31, 1887. Serial No. 248,333. (No model.)

*To all whom it may concern:*

Be it known that I, WARREN S. SMITH, a citizen of the United States, residing at St. Johnsbury, in the county of Caledonia and State of Vermont, have invented certain new and useful Improvements in Saw-Sets, of which the following is a specification.

The object of this invention is to provide a machine for setting saws, (more especially band-saws,) capable of the proper adjustment necessary for the accommodation of saws having fine or coarse teeth, and adapted to feed a saw and set the teeth at one and the same time. These results are readily accomplished by the machine illustrated in the drawings accompanying and forming a part of the following specification.

Figure 1 represents a side elevation of the improved machine having a short section of a saw in position. Fig. 2 is a plan of same. Fig. 3 shows a portion of the bed in plan view, a piece of a saw therein, and a plan section of the sliding frame to which are attached the feeding-jaws. Fig. 4 represents one of my improved adjustable setting-blocks in three positions—viz., a top, end, and bottom view—each showing a portion of the stud by which it is attached to the sliding frame. Fig. 5 is a front end view of the machine. Fig. 6 is a plan view of one of the feeding-jaws; and Fig. 7, a sectional elevation of same at $x\,x$, Fig. 6.

Similar letters indicate corresponding parts.

The bed A may be made in most any desired form, and secured to a bench or table by means of screws, as at B. A groove, $a$, for the reception of a saw, is cut longitudinally in the upper face thereof, and two or more screws, C, may be threaded to the under side of the said bed for the purpose of providing an adjustable seat for saws of various widths.

The slot or groove $a$ may be made of sufficient width to accommodate the thickest saw, and by means of a hinged plate, D, depressed within the groove $a'$ in the bed-plate A at $d$, and set-screw D', acting against one side of said plate D, a saw may be held firmly against the opposite wall of the saw-groove $a$ while being set. The saw Y must be placed smooth edge down within said groove, and it may be held properly in place by one or more rolls, E, mounted at one end of a lever-spring, $e$, screwed to the bed. A sliding frame, F, has a tongue, $f$, fitting a transverse groove, $a^2$, in the bed A, said tongue being cut away midway from either end, as at $f'$, in order that the saw Y may pass through it, as seen in Figs. 3 and 5. An arm, G, mounted on the bed A may be turned so as to bear upon said sliding frame, as in Figs. 1, 2, and 5, so as to hold the said frame in position while the machine is in operation.

Feeding jaws H, made somewhat in the form of a wedge, are pivoted one near either end and upon one side of the tongue $f$, in such manner that their points may be raised by the teeth of a saw when necessary to pull a saw past them, or while the machine is setting a saw—i. e., the sliding frame while undergoing a reciprocal movement within the groove $a^2$ carries first one and then the other of the feeding-jaws H upon the vertical face of a tooth, thus moving said tooth forward and bringing another into position. With the return movement, however, that jaw which has just moved the saw forward will be gradually raised while coming off from the next tooth by contact with the beveled side of said tooth. The threaded studs $i$ of the setting-blocks I enter slots $f^2$ formed in the frame F, in which they are secured by suitable nuts, $i'$. These slots $f^2$ are formed on an angle corresponding to that of the feeding-jaws H, and the said blocks I should be set therein at the proper point to "set over" a tooth only after the said tooth shall have been moved far enough ahead to bring the vertical face of the following tooth beyond the groove $a^2$, so that the point of the opposite jaw H may pass in behind the last-named tooth and feed that also ahead in like manner, and so on until the teeth of an entire saw shall have been operated upon.

After the setting-blocks I shall have "set," as before described, any desired set over may be determined by the position of the nuts J', threaded to the studs J, extending out from either end of the said sliding frame F, these nuts J' coming in contact with the bed-plate A, thus gaging the throw of said frame. Various mechanisms may be employed for operating the said frame, one of which I show in the drawings. This consists of a lever, K, mounted and fulcrumed at L to the bed-plate A, and having spur-teeth $k$ arranged in a semicircle, of which L is the radial point or center, the said teeth meshing with similar teeth, $f^3$, formed upon the rear side of the frame F. In this manner over one hundred teeth may be set per minute with the utmost ease and more perfectly than if done by hand or by a hand-pressure set.

A gage-plate, M, may be secured by screw $m$ to the bed-plate A, and after placing the tooth upon which the operation is to be commenced in the desired position, said gage M may then be adjusted opposite to a given tooth a certain number of teeth away from the one to be set, and in this way the operator is saved time when placing another saw having the same number of teeth to the inch. By the use of this improved machine it will be seen that the teeth are set over both ways and the saw is fed by simply moving the lever K back and forth.

Having described my improvements, what I claim as new, and desire to secure by Letters Patent, is—

1. In a saw-set, the combination of a bed-plate having a groove for receiving a saw, a sliding carriage adapted to move across said groove at a right angle, suitable saw-feeding jaws pivotally attached to said carriage and tooth-setting blocks adjustably attached thereto, and means for reciprocating said carriage to and fro upon said bed, substantially for the purpose set forth.

2. In a saw-set, the combination of a bed-plate having a groove for receiving a saw, a sliding carriage adapted to move across said groove at a right angle, suitable saw-feeding jaws pivotally attached to said carriage and tooth-setting blocks adjustably attached thereto, a lever for operating the said carriage, and means for retaining the carriage in its proper position upon said bed-plate, substantially as set forth.

3. In a saw-set, the combination of a bed-plate having a groove for receiving a saw, and a spring-roll for retaining said saw in its proper place, a sliding carriage adapted to move across said groove at a right angle, suitable saw-feeding jaws pivotally attached to said carriage and tooth-setting blocks adjustably attached thereto, a lever for operating said carriage, and means for retaining the same in its proper position upon said bed-plate, substantially for the purpose explained.

4. In a saw-set, the combination of a bed-plate having a groove for receiving a saw, an adjustable wedge for contracting said groove to various thicknesses of saws near the part being set, and a spring-roll for retaining said saw in its proper place, a sliding carriage adapted to move across said groove at a right angle, suitable saw-feeding jaws pivotally attached to said carriage and tooth-setting blocks adjustably attached thereto, a lever for operating said carriage, and means for retaining the same upon the bed while moving to and fro, substantially for the purpose specified.

5. In a saw-set, the combination of a bed-plate provided with a groove for receiving a saw, an adjustable wedge for contracting said groove to various thicknesses of saws near the teeth being operated upon, and a spring-roll for retaining said saw in its proper place, a sliding carriage adapted to move across said bed at a right angle with said groove, and provided at each end with a set-screw for adjusting its reciprocal movement, as shown, suitable saw-feeding jaws pivotally attached to said carriage and tooth-setting blocks adjustably attached thereto, means for adjusting various widths of saws in the bed, substantially as described, and mechanism comprising a rack, segment of a pinion, and a lever for operating the said carriage, for the purpose set forth.

In testimony whereof I affix my signature in presence of two witnesses.

WARREN S. SMITH.

Witnesses:
J. B. THURSTON,
J. E. FERNALD.